Jan. 31, 1933.　　　O. H. HOLLOWELL　　　1,895,714
TRAP
Filed Feb. 10, 1932　　　3 Sheets-Sheet 1

Inventor
O. H. Hollowell
By C. A. Snow & Co.
Attorneys.

Jan. 31, 1933. O. H. HOLLOWELL 1,895,714

TRAP

Filed Feb. 10, 1932 3 Sheets-Sheet 2

Fig. 2.

Inventor
O. H. Hollowell
By C. A. Snow & Co.
Attorneys.

Jan. 31, 1933.　　　O. H. HOLLOWELL　　　1,895,714
TRAP
Filed Feb. 10, 1932　　　3 Sheets-Sheet 3
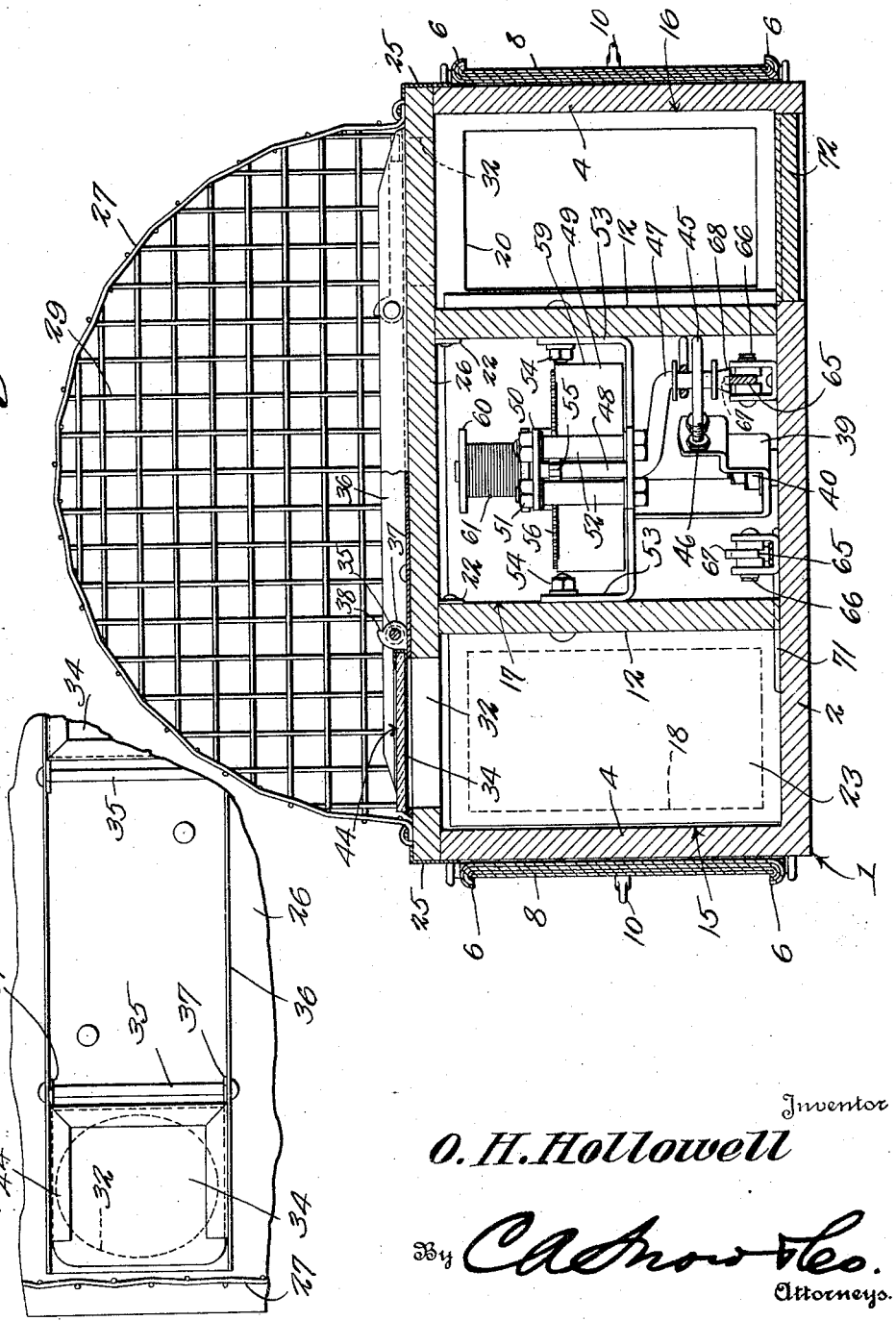
Inventor
O. H. Hollowell
By C. A. Snow & Co.
Attorneys.

Patented Jan. 31, 1933

1,895,714

UNITED STATES PATENT OFFICE

OLIVER HENRY HOLLOWELL, OF RUSSELLVILLE, ARKANSAS

TRAP

Application filed February 10, 1932. Serial No. 592,140.

The device forming the subject matter of this application is a trap, adapted to be made in any size, for taking animals of any kind, and the invention aims to provide novel means, actuated by the animal after it has entered the trap, for moving the doors of the trap to and from closed position. Another object of the invention is to provide novel means for keeping the trapped animals in a cage, which may be taken off the body of the trap, to permit the animals to be drowned or killed otherwise. A further object of the invention is to supply novel means for keeping count of the animals caught.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Fig. 2 is a top plan, the cage having been taken off;

Fig. 3 is a transverse section;

Fig. 4 is a fragmental bottom plan showing a portion of the cage.

Figure 1:
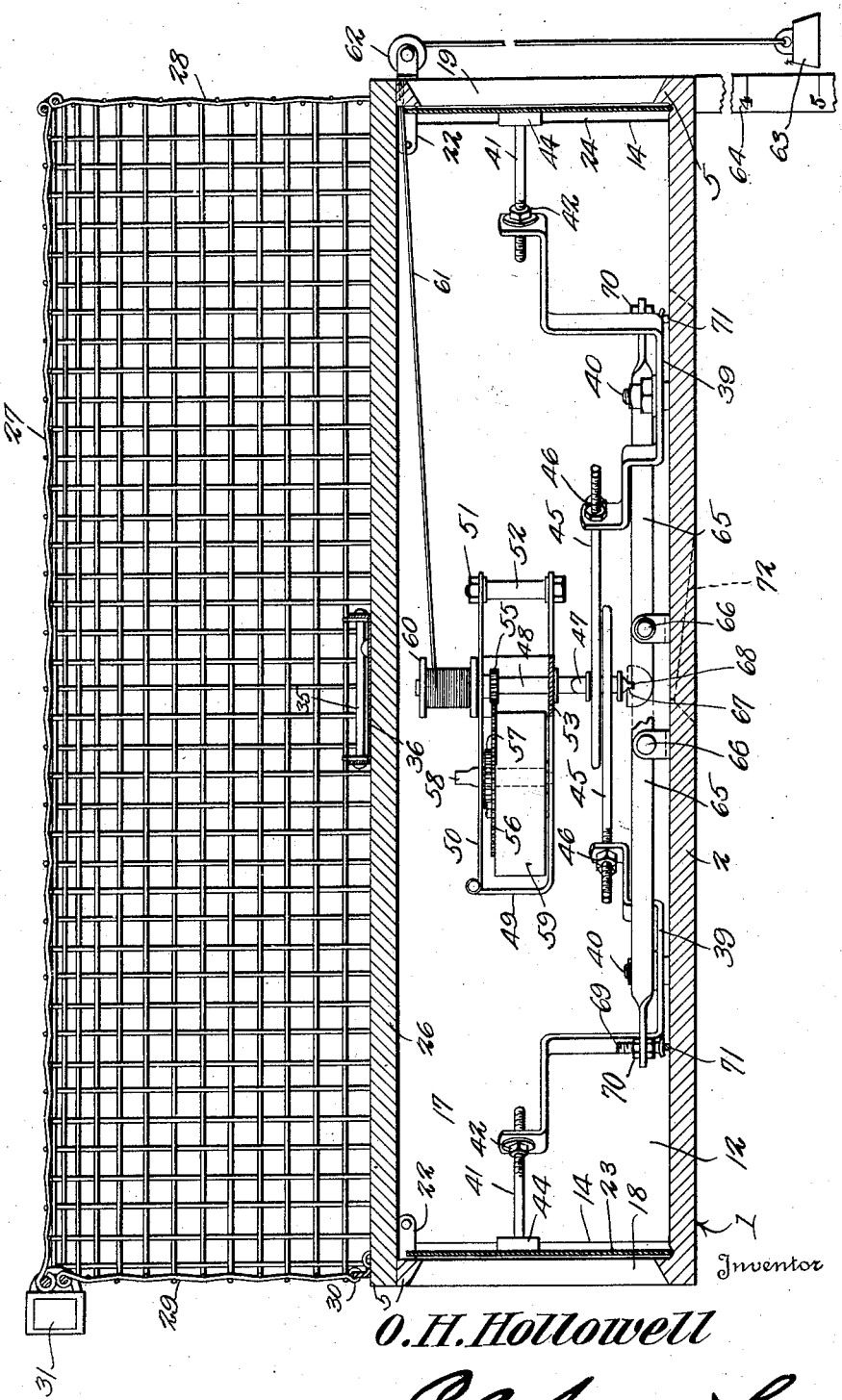
Fig. 1 shows in vertical longitudinal section, a trap constructed in accordance with the invention.

The trap forming the subject matter of this application comprises a box-like body 1, which is open at the top, saving insofar as it is closed by the bottom of the removable cage, to be described in detail hereinafter.

The body 1 of the trap comprises a bottom 2, sides 4, and ends 5. Longitudinally extensible telescopic leaders 8 are hinged at 9 to the ends of the body 1, and comprise rigid plates, having slidably engaged flanges 6 on their upper and lower edges.

By sliding the plates of the leaders 8 together, as shown in Fig. 2, the leaders can be shortened, so that their combined length is less than the length of the body 1, and then the leaders may be held against the sides 4 by wing nuts 10 threaded on studs 11 carried by the sides 4. The leaders 8 may be elongated and swung outwardly beyond the ends 5 of the body, in inwardly converging relation, as shown in dotted line in Fig. 2, and then the leaders will direct the animals to the doorways 18—20—19—21, hereinafter alluded to.

Figs. 2 and 3 show that longitudinal partitions 12 extend upwardly from the bottom 2 of the body 1 to the upper part of the body. The partitions 12 terminate short of the ends 5 of the body, to form slots 14, which are clearly shown in Figs. 2 and 1 of the drawings. The partitions 12 define runways 15 and 16 at the opposite sides of the trap, with a machinery compartment 17 disposed between the partitions, along the longitudinal center of the trap.

In one of the ends 5 of the body 1, as shown in Fig. 2, there are doorways 18 and 20, giving access, respectively, to the runway 15 and to the runway 16. In the opposite end wall 5 of the body 1 there are corresponding doorways 19 and 21, giving access, respectively, to the runway 15 and to the runway 16.

On the outer ends of the partitions 12 there are notched guides 22. The guides 22 extend across the slots 14. Doors 23 and 24 slide in the slots 14, on the bottom 2 of the body 1, and underneath the guides 22. Fig. 2 shows that the length of the doors 23 and 24 is such that they can, for instance, close the doorways 18 and 19, and extend across the machinery compartment 17, without closing the doorways 20 and 21. The door 23 of Fig. 2 controls the doorways 18 and 20, and the door 24 controls the doorways 19 and 21.

Refering to Fig. 3, it can be seen that, on the sides 4 of the body 1, there are guides 25, overhanging the upper edges of the sides 4. Underneath these guides 25 is slidably mounted the bottom 26 of a cage 27, the bottom 26 constituting a closure for the top of the box-like body 1. The cage 27 has a fixed end wall 28 (Fig. 1) and at the opposite end of the cage 27 there is a door 29, adapted to be swung downwardly to an open position, on a hinge 30 carried by the bottom 26 of the cage. The door 29 of the cage is held closed in any suitable way, for instance, through the instrumentality of a lock 31 engaged with the upper part of the door 29 and with the upper part of the cage 27. The cage 27 preferably is made of strong netting, of the form shown in the drawings.

The bottom 26 of the cage 27 is provided with openings 32, shown in Fig. 3. These openings 32 are located above the runways 15 and 16, and are placed at a point intermediate the ends of the runways.

The openings 32 are closed by transparent plates 34 mounted in frames 44, adapted to swing upwardly and inwardly. The frames 44 comprise disk-like parts 37 (Figs. 3 and 4) mounted to swing on pivot elements 35 carried by a channel-shaped bracket 36 secured to the upper surface of the bottom 26 of the cage 27, and extended transversely of the cage. Fig. 3 shows that the parts 37 of the frames 44 have projections 38, which, cooperating with the bottom of the channel-shaped bracket 36, prevent the frames 44 and the transparent plates 34 that are carried thereby, from flopping too far inwardly, when they are raised by the rats or other animals passing through the openings 32. The construction is such that after the animals have raised the parts 34—44 and passed from the runways 15 and 16 into the cage 27, the said members 34—44 will tend to gravitate to the closed position shown at the left hand side of Fig. 3 of the drawings.

Horizontally movable first levers 39 are located in the machinery compartment 17, and are fulcrumed at 40, intermediate their ends, on the bottom 2 of the body 1. In Fig. 1 it is shown that the outer ends of the levers 39 extend upwardly and then outwardly, and carry longitudinally adjustable extensions 41, held in place by nuts 42, and the outer ends of the extensions 41 cooperate pivotally with sockets 43 on the inner surfaces of the doors 23 and 24. The inner ends of the first levers 39 extend upwardly, but not so high as the outer ends of the said levers, and in the inner ends of the levers 39 are mounted, for longitudinal adjustment, U-shaped extensions 45, held in place by nuts 46. The construction is such that it may be stated that the levers 39 are provided at their inner ends with elongated slots, represented by the extensions 45.

Fig. 2 shows that the extensions 45 of the first levers 39 are crossed on each other, and in them, at their point of crossing, is mounted a crank 47 (Fig. 3) on the lower end of a vertical shaft 48 which is journaled for rotation in the frame 49 of a spring motor, located in the machinery compartment 17. This spring motor, of course, may be of any desired form, the simple construction shown in the drawings being ample for the purposes in view. To facilitate the assembly of the spring motor, the frame 49 includes a hingedly mounted top 50, held in place by nuts 51 on spacers 52 disposed between the bottom portion of the frame 49 and the hinged top 50, as shown in Fig. 1. Figs. 3 and 2 disclose the fact that the spring motor frame 49 has laterally and upwardly extended arms 53, which are secured at 54 to the partitions 12.

A pinion 55 is secured to the shaft 48, within the motor frame 49, and meshes with a gear wheel 56 held by a pawl and ratchet mechanism 57 on a winding shaft 58, which is vertically disposed, the winding shaft being journaled in the frame 49 and in its top 50. A spring 59 is coiled around the winding shaft 58 and is connected to the winding shaft and to the gear wheel 56.

A reel 60 is secured to the upper end of the shaft 48. About the reel 60 is wound a flexible element 61 extended downwardly, as far as desired, over a pulley 62 mounted on one end 5 of the body 1 of the trap. On the lower end of the flexible element 61 there is a weight 63, adapted to cooperate with a scale 64, located at any convenient place remote from the trap, for instance, in an office, and adapted to indicate, through an operation which will be described hereinafter, how many animals have been caught in the trap.

It can be seen, in Fig. 2, that second levers 65 are located in the machinery compartment 17, on opposite sides of the spring motor. The levers 65 are fulcrumed at 66, intermediate their ends, as shown in Fig. 1, on the bottom 2 of the body 1, to swing vertically. The levers 65 are fulcrumed at 66 nearer to their inner ends than to their outer ends, and the outer ends of the levers, therefore, tend to swing downwardly, by gravity. On the inner ends of the levers 65 there are vertical shoulders 67 one of which is shown in Fig. 1, the shoulders 67 of the levers 65 being adapted to cooperate, one at a time, with the flattened lower end 68 of the crank 47 on the shaft 48, to prevent the shaft from rotating, responsive to the spring motor. In the outer ends of the second levers 65 there are vertically adjustable members 69 (Fig. 1) adapted to be held in place, after adjustment, by nuts 70. The vertically adjustable members 69 have lateral arms 71 (Fig. 2) at their lower ends, the arms being adapted to rest on the bottom 2 of the body 1 of the trap, to stop the downward movement of the outer ends of the levers 65. The arms 71 project, respectively, into the runways 15 and 16, as Fig. 2 will show.

The arms 71 on the outer ends of the second levers 65 extend above the outer ends of vertically tiltable platforms 72 and 74, the platform 72 being located in the runway 16, and the platform 74 being located in the runway 15. The platforms 72 and 74 are pivotally mounted, intermediate their ends, as shown at 73, on the body of the trap. The inner ends of the tiltable platforms 72 extend underneath the transparent plates 34 that are indicated and shown in Fig. 3 of the drawings, the transparent plates, it will be recalled, being hinged to the bottom 26 of the cage 27 for vertical swinging movement.

Suppose that, as shown in Fig. 2, the doors 23 and 24 are in such a position as to close the doorways 18 and 19 of the runway 15, and to open the doorways 20 and 21 of the runway 16. Then an animal (guided by the extended leaders 8, if desired) can enter the runway 16 either by the door 20 or by the door 21. Attracted by the light shining downwardly through the transparent plate 34 which is above the runway 16, the animal moves toward the middle part of the runway, and, ultimately, reaches the inner end of the tiltable platform 72 of Fig. 2. The inner end of the platform 72 moves downwardly, under the weight of the animal, and the outer end of the said platform moves upwardly. When the outer end of the platform 72 moves upwardly, it engages the corresponding arm 71, and raises the outer end of the second lever 65 which carries the arm 71 that is under discussion. The inner end of the lever 65 (the right hand lever 65 in Fig. 1) moves downwardly, and this disengages the shoulder 67 on the inner end of the said lever from the flattened lower end 68 of the crank 47 on the shaft 48. This permits the shaft 48 to make a rotation of 180 degrees, responsive to the spring motor, and when the shaft 48 has rotated 180 degrees, the flattened lower end 68 of the crank 47 engages the shoulder 67 of the lever 65 that is nearest to the runway 15 in Fig. 2, further rotation of the shaft thus being stopped.

When the shaft 48 is rotated, as aforesaid, by the spring motor, the crank 47 on the shaft, cooperating with the U-shaped extensions 45 of the levers 39, swings the levers 39 on their fulcra 40, the extensions 41 on the outer ends of the levers 39 moving the doors 23 and 24 until they close the doorways 20 and 21, and open the doorways 18 and 19. When the doorways 18 and 19 are opened, the trap is rendered operative, so far as the runway 15 and the platform 74 are concerned, and since the doorways 20 and 21 of the runway 16 are closed, respectively, by the doors 23 and 24, the animal is trapped in the runway 16.

The trapped animal, noting the light proceeding downwardly through the transparent plate 34 which is individual to the runway 16, raises the said plate, on its hinged mounting 37—35, and passes into the cage 27, the said transparent plate closing the corresponding opening 32, as soon as the animal is in the cage 27.

At any time, the cage 27 may be separated from the body 1 of the trap, because the bottom 26 of the cage is slidably engaged beneath the guides 25 on the trap body. The cage 27, with the animals therein, may then be doused in water, or handled otherwise, to bring about an extermination of the animals in the cage, it being possible to remove the said animals from the cage, by opening the cage door 29 of Fig. 1.

Each time that the crank 47 on the shaft 48 swings through an arc of 180 degrees, a portion of the flexible element 61 is paid off the reel 60 that is carried at the upper end of the shaft 48, and the weight 63 of Fig. 1 is raised accordingly, the weight cooperating with the scale 64, to indicate thereon the number of animals that have been taken.

What is claimed is:—

1. A trap comprising a body, runways at the sides of the body, the body having a doorway for each end of each runway, slidable doors of such length as to close both doorways of one runway and leave both doors of the other runway open, means for segregating animals trapped in either runway, a spring motor in the body, between the runways, and having a crank, first levers fulcrumed intermediate their ends on the body, the inner ends of the first levers being engaged with the crank, and the outer ends of the first levers being pivotally engaged with the doors, second levers fulcrumed intermediate their ends on the body, the second levers having their inner ends disposed in the path of the crank, thereby to stop the motor, tiltable platforms in the runways, and means for connecting the platforms with the second levers, to tilt the second levers, one at a time, and disengage them, alternately, from the crank.

2. A trap comprising a body, runways at the sides of the body, the body having a doorway for each end of each runway, slidable doors of such length as to close both doorways of one runway and leave both doors of the other runway open, means for segregating animals trapped in either runway, a spring motor in the body, between the runways, and having a crank, first levers fulcrumed intermediate their ends on the body, the inner ends of the first levers being engaged with the crank, and the outer ends of the first levers being pivotally engaged with the doors, movable means carried by the body and disposed in the path of the crank, thereby to stop the motor, tiltable platforms in the runways, and mechanism for connecting the platforms operatively with said movable means, to withdraw said movable means from engagement with the crank.

3. A trap comprising a body, runways at the sides of the body, the body having a doorway for each end of each runway, slidable doors of such length as to close both doorways of one runway and leave both doors of the other runway open, means for segregating animals trapped in either runway, a spring motor in the body, means for connecting the spring motor operatively with either door, the spring motor including a crank, levers fulcrumed intermediate their ends on the body, the levers having their inner ends disposed in the path of the crank, thereby to stop the motor, tiltable platforms in the runways, and means for connecting the platforms with the levers, to tilt the levers, one at a time, and disengage them, alternately, from the crank.

4. A trap comprising a body, a runway in the body, the body having a doorway for the runway, a slidable door controlling the doorway, a spring motor in the body, and having a crank, a first lever fulcrumed intermediate its ends on the body, the inner end of the first lever being engaged with the crank, and the outer end of the lever being pivotally engaged with the door, a second lever fulcrumed intermediate its ends on the body, the second lever having its inner end disposed in the path of the crank, thereby to stop the motor, a tiltable platform in the runway, and means for connecting the platform with the second lever, to tilt the second lever and disengage it from the crank.

5. A trap comprising a body having sides and ends, the ends having doorways, means carried by the body for trapping animals entering the body through the doorways, leaders, and hinges uniting the leaders to the body and located closely adjacent to the ends of the body, the leaders being movable on the hinges into outstanding converging relation to the ends, so as to direct animals to the doorways, the leaders being longitudinally extensible and comprising slidably interengaged parts, whereby the leaders can be extended to make a long, guiding approach to the doorways, and whereby the leaders can be reduced in length until the leaders at each side of the body can be swung inwardly into the same plane and lie along the sides of the body.

In testimony that I claim the foregoing as my own, I have hereto affixed my signature.

OLIVER HENRY HOLLOWELL.